(12) United States Patent
Pipitone et al.

(10) Patent No.: US 9,069,201 B2
(45) Date of Patent: Jun. 30, 2015

(54) WATERPROOF USER INTERFACE DISPLAY PANELS

(71) Applicant: Balboa Water Group, Inc., Tustin, CA (US)

(72) Inventors: Anthony Pipitone, Laguna Niguel, CA (US); James J. Johnson, Lake Forest, CA (US); Jerrell P. Hollaway, Melbourne, FL (US)

(73) Assignee: Balboa Wter Group, Inc., Tustin, CA (US)

( * ) Notice: Subject to any disclaimer, the term of this patent is extended or adjusted under 35 U.S.C. 154(b) by 0 days.

(21) Appl. No.: 14/532,378

(22) Filed: Nov. 4, 2014

(65) Prior Publication Data
US 2015/0055034 A1 Feb. 26, 2015

Related U.S. Application Data

(63) Continuation-in-part of application No. 13/646,604, filed on Oct. 5, 2012, now Pat. No. 8,953,117, which is a continuation-in-part of application No. 12/661,530, filed on Mar. 19, 2010, now Pat. No. 8,294,843.

(60) Provisional application No. 61/974,684, filed on Apr. 3, 2014.

(51) Int. Cl.
G02F 1/1333 (2006.01)
A61H 33/00 (2006.01)

(52) U.S. Cl.
CPC ...... *G02F 1/133308* (2013.01); *G02F 1/13338* (2013.01); *A61H 33/60* (2013.01); *G02F 2001/133311* (2013.01); *A61H 2201/5046* (2013.01); *G02F 2201/36* (2013.01)

(58) Field of Classification Search
CPC ......... G02F 2001/133311; G02F 2001/133328
See application file for complete search history.

(56) References Cited

U.S. PATENT DOCUMENTS

| | | | |
|---|---|---|---|
| 4,791,258 A | 12/1988 | Youtz et al. | |
| 5,012,124 A | 4/1991 | Hollaway | |
| 5,332,944 A | 7/1994 | Cline | |
| 5,748,269 A | 5/1998 | Harris et al. | |
| 5,883,459 A | 3/1999 | Cline et al. | |
| 6,265,665 B1 * | 7/2001 | Zahnen | 174/92 |
| 6,310,612 B1 | 10/2001 | Kotsubo et al. | |
| 6,329,593 B1 | 12/2001 | Yang | |
| 6,355,881 B1 | 3/2002 | Braeges et al. | |
| 6,721,651 B1 | 4/2004 | Minelli | |
| 6,888,591 B2 | 5/2005 | Kim | |
| 6,897,852 B2 | 5/2005 | Grosfeld et al. | |
| 7,184,027 B2 | 2/2007 | Sato et al. | |
| 2002/0149571 A1 | 10/2002 | Roberts | |
| 2003/0052764 A1 * | 3/2003 | Iwao et al. | 336/75 |
| 2004/0014566 A1 | 1/2004 | Kao | |
| 2005/0097666 A1 | 5/2005 | Christensen | |
| 2005/0144863 A1 | 7/2005 | Collins | |
| 2008/0129578 A1 | 6/2008 | Petersen | |
| 2008/0246741 A1 | 10/2008 | Hinata | |
| 2009/0244026 A1 | 10/2009 | Purdy | |
| 2010/0238119 A1 | 9/2010 | Dubrovsky | |
| 2012/0300486 A1 | 11/2012 | Matsushita et al. | |

* cited by examiner

*Primary Examiner* — Sung Pak
*Assistant Examiner* — Chris Chu
(74) *Attorney, Agent, or Firm* — Larry K. Roberts

(57) ABSTRACT

A waterproof user interface panel includes an electronic display assembly having a touch or presence-sensitive surface.

16 Claims, 12 Drawing Sheets

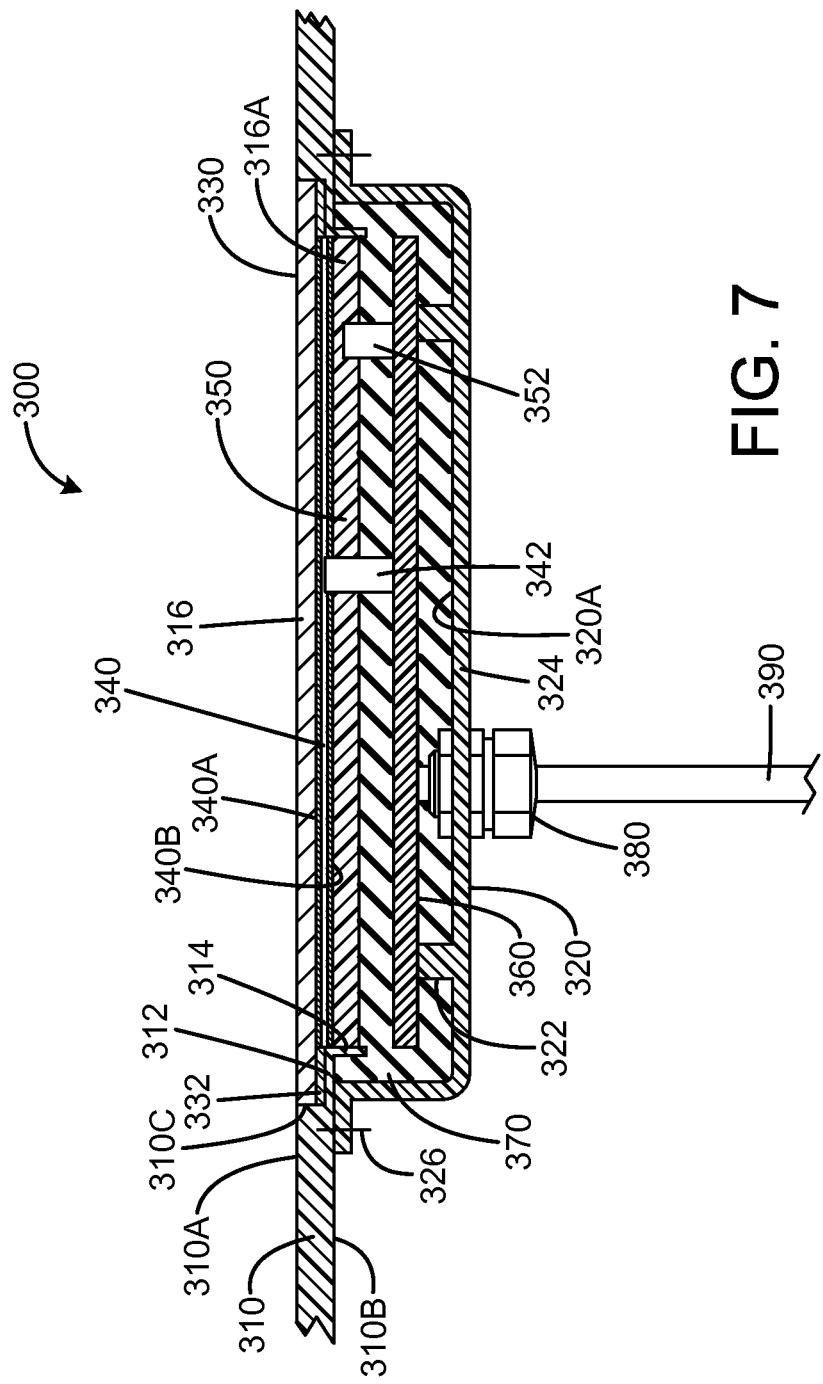

WATERPROOF USER INTERFACE DISPLAY PANELS

CROSS-REFERENCE TO RELATED APPLICATION

This application claims priority to U.S. Application 61/974,684, filed Apr. 3, 2014; and is a continuation-in-part of U.S. application Ser. No. 13/646,604, filed Oct. 5, 2012, which in turn is a continuation-in-part of U.S. Ser. No. 12/661,530, filed Mar. 19, 2010, now U.S. Pat. No. 8,294,843, the entire contents of which applications are hereby incorporated by reference.

BACKGROUND

This invention relates to touch screen user interface panels and, more particularity, to user interface display panels used in spas and whirlpool baths.

BRIEF DESCRIPTION OF THE DRAWINGS

FIG. 7 is a diagrammatic cross-section of a further embodiment of a user interface panel for a spa or whirlpool bath.

DETAILED DESCRIPTION

Figure 1:
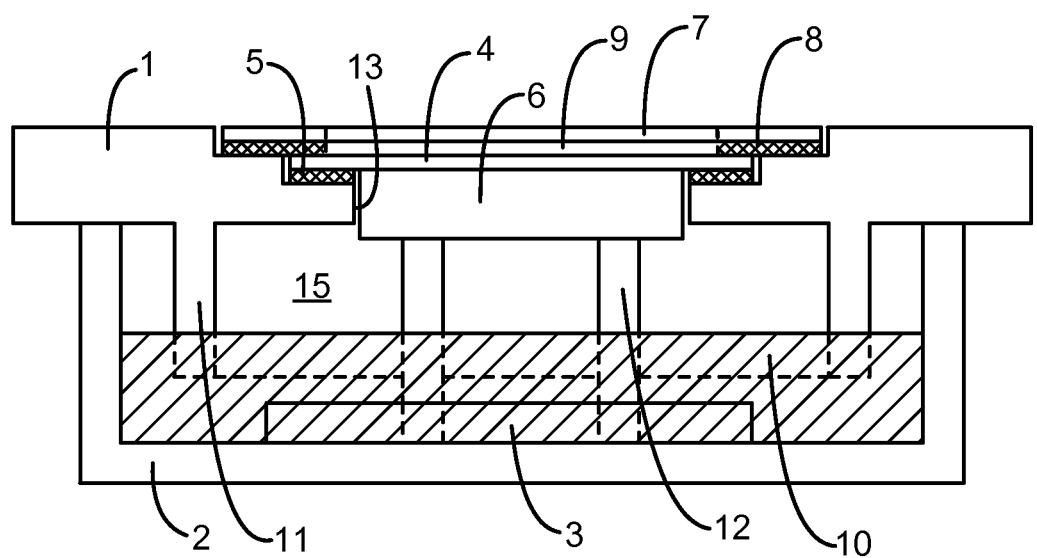
FIG. 1 illustrates the construction of an exemplary embodiment of a touch screen panel in a cross sectional view.
Figure 2:
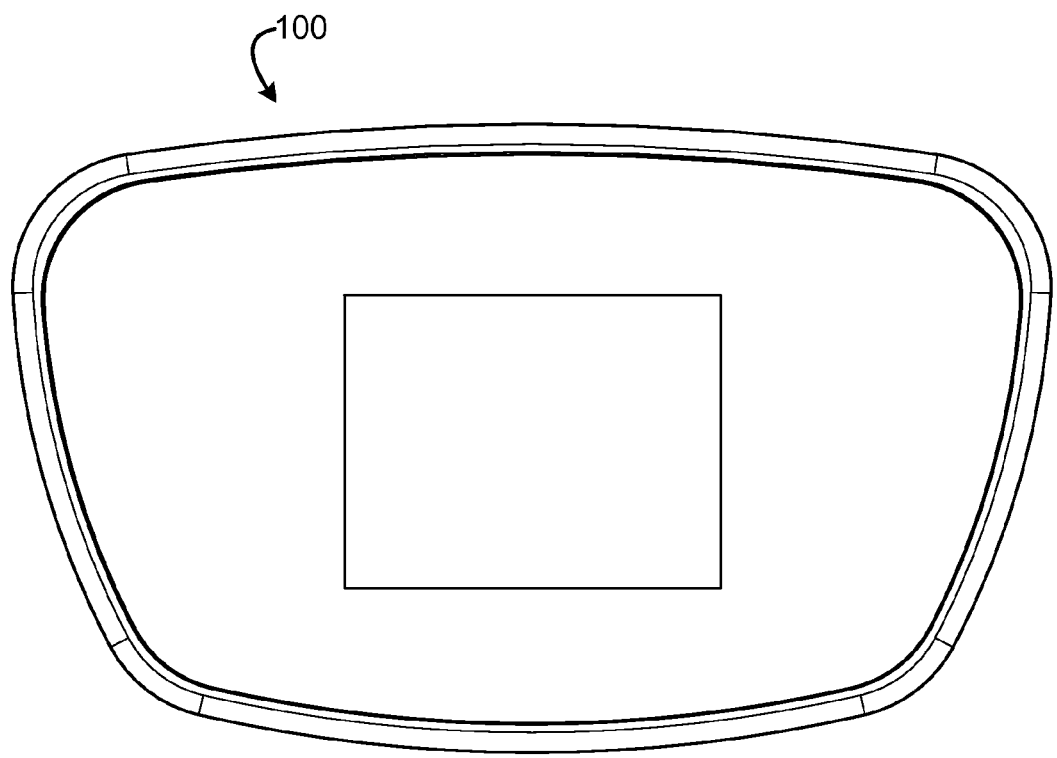
FIG. 2 is a top view of an alternate embodiment of a touch screen panel.
Figure 3:
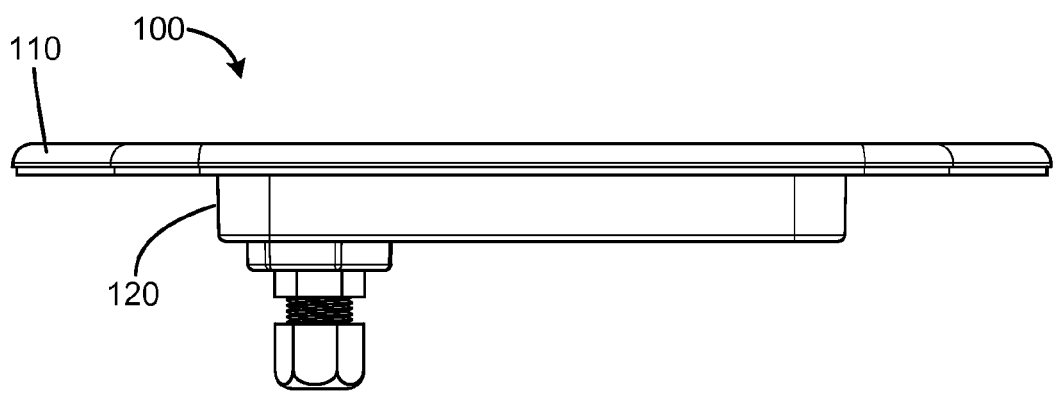
FIG. 3 is a side view of the touch screen panel of FIG. 2.

Referring now to FIG. 1, the housing of an exemplary embodiment of the product includes an upper housing 1 and lower housing 2. LCD/touch screen assembly 6 is positioned in contact with, or very near, protective film 4, which is held in contact with upper housing 1 over cutout area 13 in the housing by means of adhesive layer 5. Another layer of protection is provided by decorative overlay 7, which is held in position by adhesive layer 8. Adhesive layer 8 overlaps the vertical positioning of adhesive layer 5 so that the interface between 1 and 4 is covered.

Circuit board 3 is positioned and secured to lower housing 2 and electrically coupled to LCD/touch screen assembly 6. Silicone gel 10 is placed in lower housing 2 to cover circuit board 3, making circuit board 3 virtually waterproof.

When upper housing 1 and lower housing 2 are joined together and secured with fasteners, protrusion 11 from upper housing 1 penetrates silicone gel 10, making the back side of LCD/touch screen 6 also waterproof.

Protrusion 12 from lower housing 2 holds LCD/touch screen assembly 6 in a secured position.

In operation, protective film 4 lies directly on top of the touch screen surface of assembly 6. Film 4 is thin enough to be flexible when lightly touched. A thickness of 0.020 inches is known to work well when the material is polycarbonate. In all cases, the material must be very flat, without high and low spots which could cause false switching. The adhesive material used in 5 and 8 is water resistant. Several foam gasket materials are available, as well as adhesive films, such as 3M 467MP and 468MP. The use of decorative overlay 7 with adhesive layer 8 provides a small air gap 9, which is the same as the thickness of adhesive layer 8. This air gap improves the performance of the product in certain environments.

Additional methods of securing 6 in position with film 4 may be employed. An adhesive material between 6 and 1, correctly applied, can eliminate the need for protrusion 12 from lower housing 2 to secure LCD/touch screen assembly 6.

Lower housing 2 is constructed to allow circuit board 3 to be secured to 2 and covered with sealing material 10, prior to final assembly of the two housing parts, 1 and 2. The final seal is made when protrusion 11 from 1 are embedded in sealing material 10.

When constructed as described, the user interface panel is waterproof from moisture on the top surface of the panel as well as from moisture from the bottom and sides of the panel, even though the LCD/touch screen assembly is not constructed to be waterproof.

In another preferred embodiment, the protective film is ultrasonically bonded to the housing. In yet another preferred embodiment, the film is attached with an adhesive material able to fuse plastic materials, such as PVC cement.

The present invention may be used on spas, hot tubs, baths, swimming pools, steam baths, showers, and similar products.

Another embodiment of a user interface panel is illustrated in FIGS. 2-6B. This embodiment addresses a potential issue of reliability and performance which can result when a sealed user interface panel is used in a hot environment, such as spas, hot tubs, baths, swimming pools, steam baths, and showers. A void may exist in the sealed housing assembly between the surface of encapsulant material covering the circuit board and the back of the LCD assembly and undersurface of the top housing. With the panel in such an environment, the air within the void tends to expand, increasing the pressure, and this is in a sealed structure. The increase in pressure within the housing can tend to lift the thin protective film housing structure. The increase in pressure within the housing can tend to lift the thin protective film away from the LCD/touch screen assembly, and lead to performance issues in which button pushes are not recognized, and possible delamination issues in which the film separates from the housing structure.

To address this potential issue, in an exemplary embodiment, a vent is established between the void within the sealed housing and the ambient atmosphere. The vent may be covered by a filter which blocks transfer of solid water, but allows air and water vapor to pass. An exemplary embodiment of the user interface panel 100 with such a vent is illustrated in FIGS. 2-6B. As with the embodiment of FIG. 1, panel 100 includes an upper housing 110 with a top surface 110A, and a lower housing 120 with a bottom surface 120A. A cutout area 113 is formed in the upper housing 110. An electronic display 160 with assembled or integrated touch screen is positioned in contact with, or very near, protective film 140. The film 140 is held in contact with the upper housing 110 over the cutout area 113 by an adhesive layer (not shown in FIGS. 4B and 4C). Another layer of protection is provided by a decorative or informative overlay 180, which is held in position to the upper housing by an adhesive layer (not shown in FIGS. 4B and 4C). The electronic display 160 can be supported on tab portions 112 (FIGS. 4A and 4B) of the upper housing structure 110 which protrude inwardly into the cutout area. Standoff portions 122 protrude upwardly from the lower housing 120, and can provide additional support in the event the electronic display 160 is pushed downwardly by user button pressing.

Figure 4A:
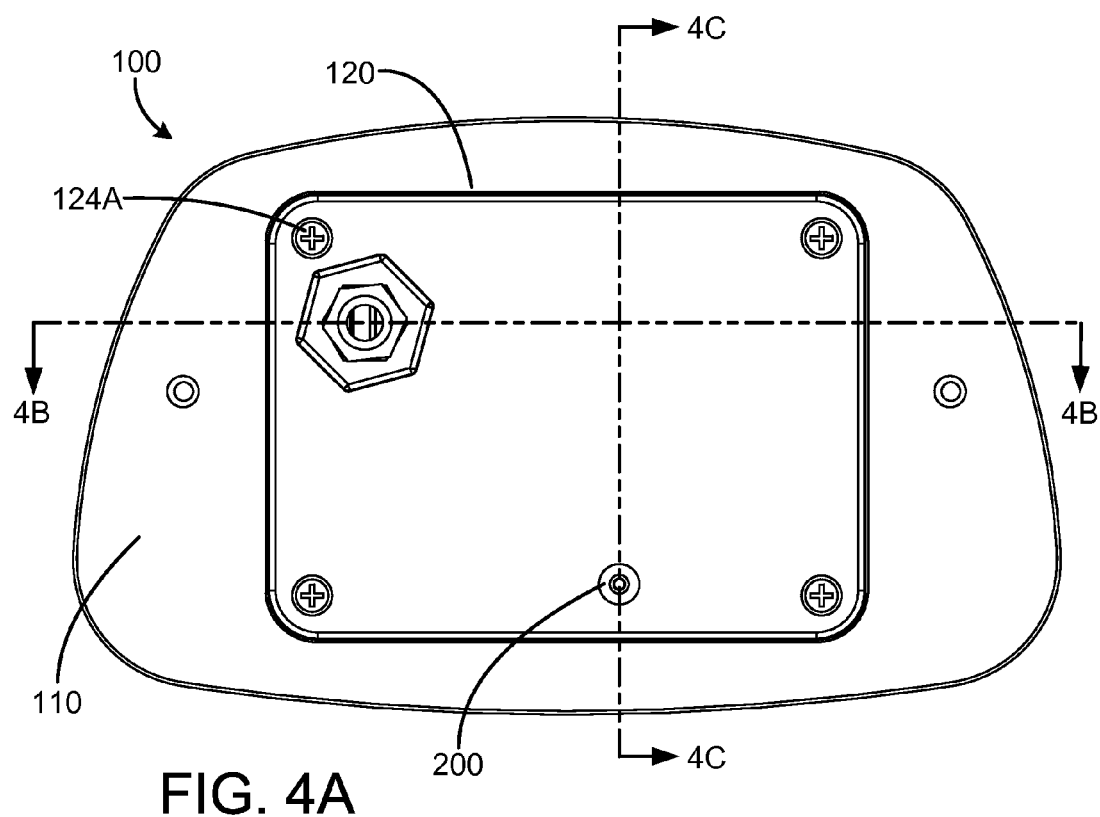
FIG. 4A is a bottom view of the touch screen panel of FIG. 2.
Figure 4B:
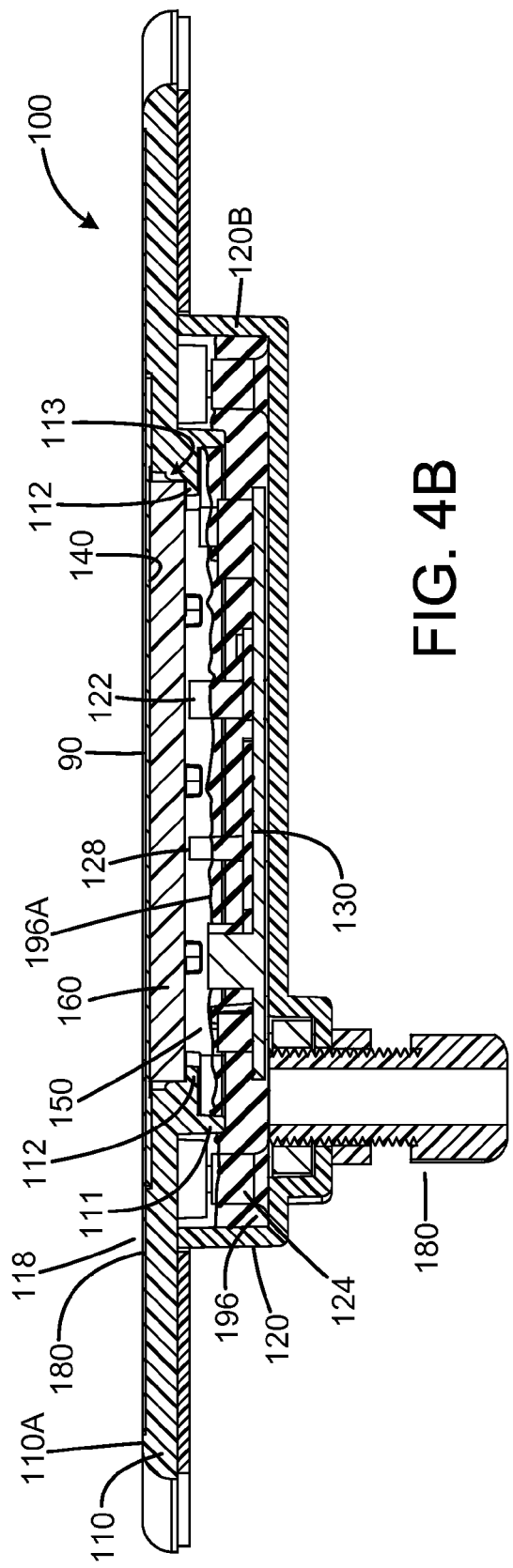
FIG. 4B is a cross-sectional view taken along line 4B-4B of FIG. 4A.

In this exemplary embodiment, the lower housing 120 and upper housing 110 are secured together by threaded fasteners 124A (FIG. 4A) passed through bosses 124 in the lower housing and into corresponding bosses 118 in the upper housing 110 (FIG. 4B).

A circuit board 130 is positioned adjacent the bottom floor of the lower housing 120 and secured in place. The circuit board is electrically coupled to the display assembly 160. A layer 196 of waterproof potting compound or silicone gel is placed in the lower housing and covers most or all of the circuit board 130 and components mounted to the circuit board. A void 150 is created between the upper surface of the layer 196 and the back side surface of the display assembly 160. A circumferential protrusion 111 extends downwardly from the upper housing 110, surrounding the cutout area 113, and penetrates the gel 196, making the back side of the assembly 160 water proof. The circuit board 130 is electrically connected to the electronic display 160 by wiring (not shown). Power and signal wiring from the external environment, e.g. from a control system, is connected to the circuit board 130 through waterproof passthrough 180.

When constructed as described, the user interface panel 100 is waterproof from moisture on the top surface of the panel as well as from moisture from the bottom and sides of the panel, even though the touch screen assembly is not constructed to be waterproof.

Figure 4C:
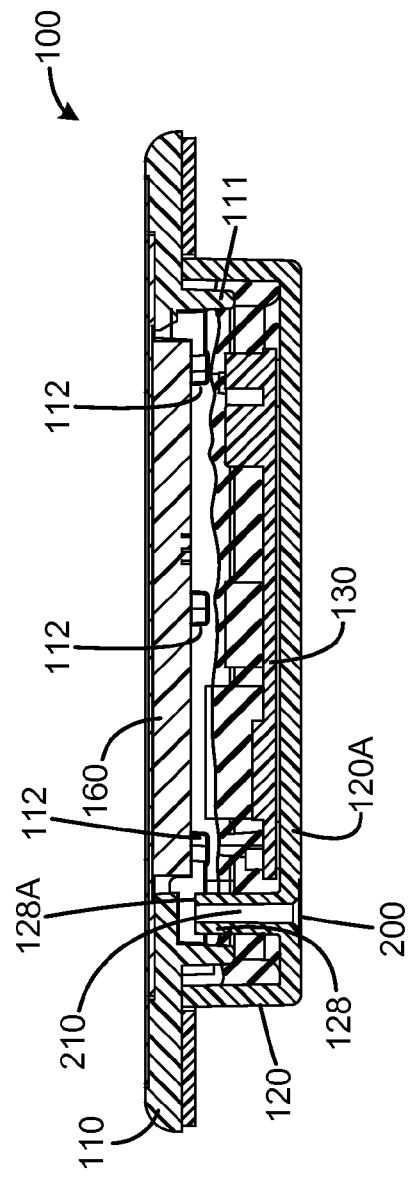
FIG. 4C is a cross-sectional view taken along line 4C-4C of FIG. 4A.
Figure 5A:
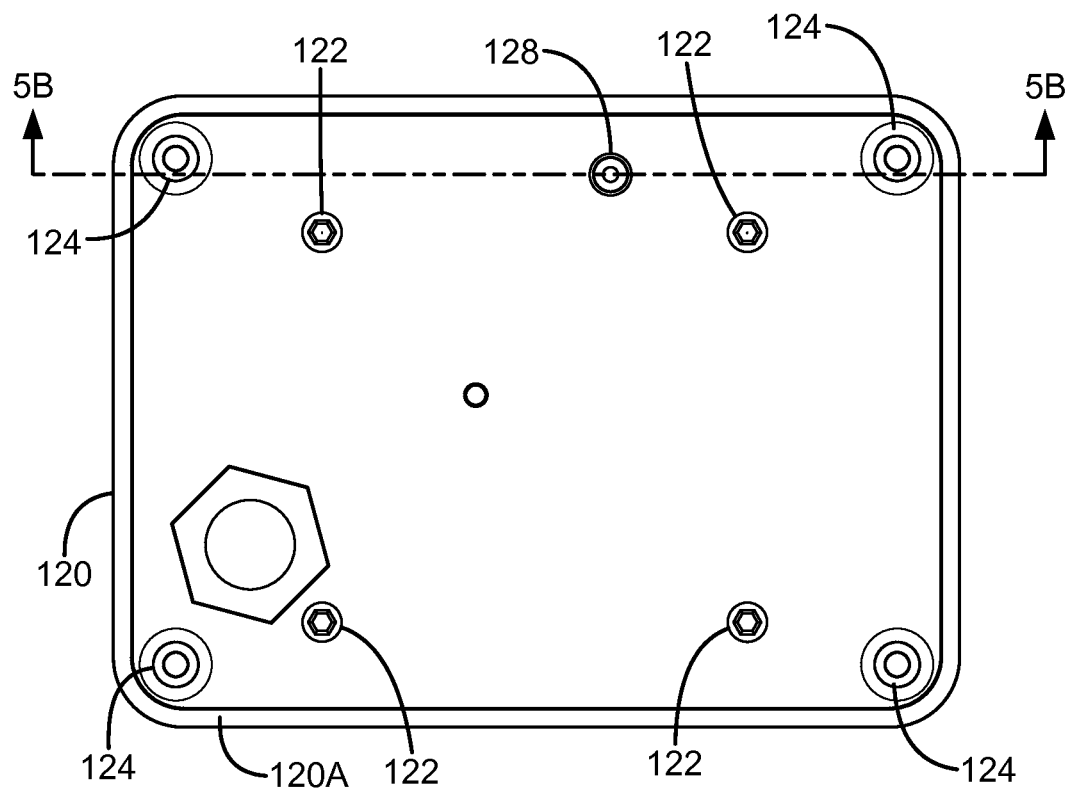
FIG. 5A is a top view of the lower housing structure of the touch screen panel of FIG. 2.
Figure 5B:
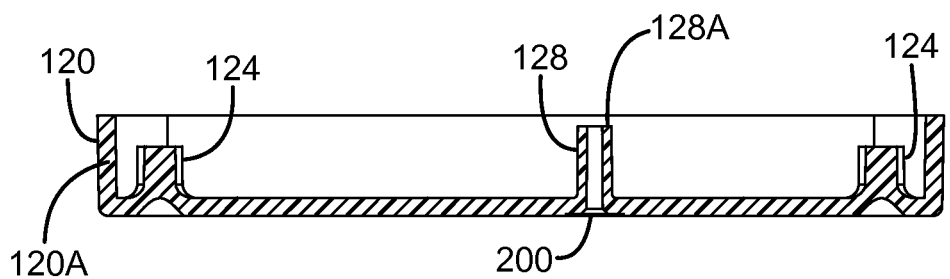
FIG. 5B is a cross-sectional view taken along line 5B-5B of FIG. 5A.
Figure 6A:
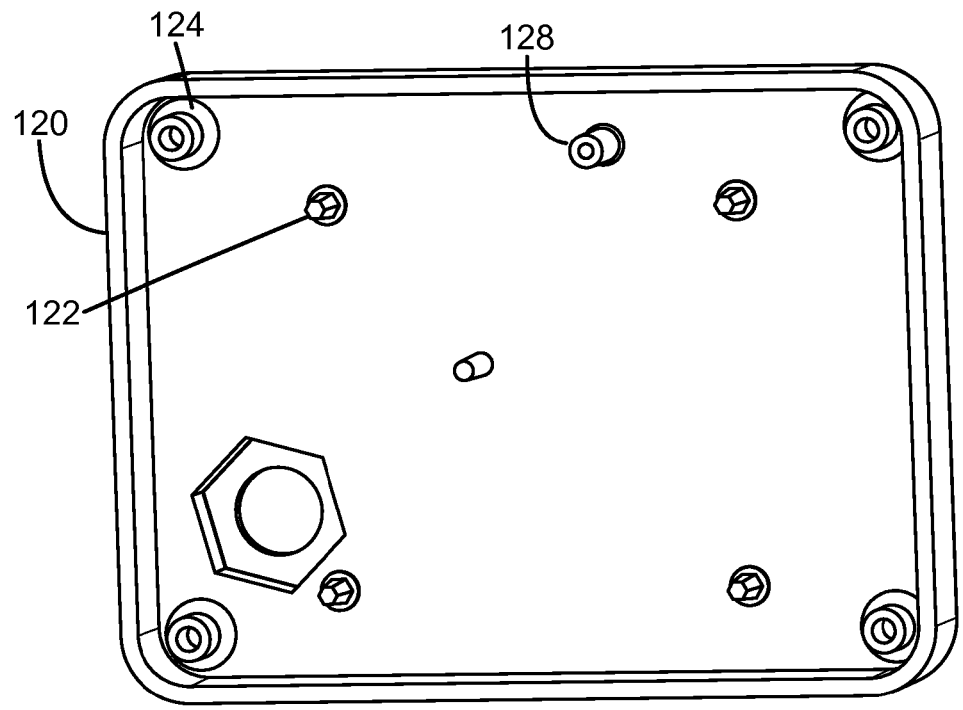
FIG. 6A is an isometric top view of the lower housing structure of FIG. 5A.
Figure 6B:
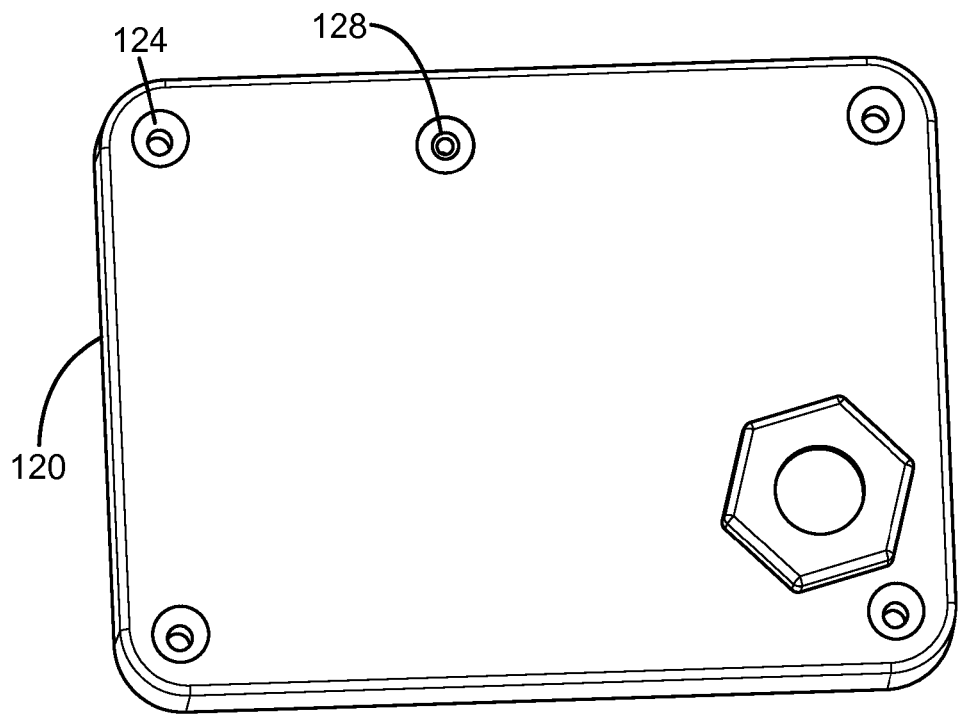
FIG. 6B is an isometric bottom view of the lower housing structure of FIG. 5A.

In this exemplary embodiment, the void 150 is vented to the external environment by hollow boss 128, which is open through its longitudinal extent, between the bottom 120A of the lower housing 120 and the distal, upper tip 128A of the boss 128 (see FIG. 4C). A filter 200 covers the bottom surface opening of the hollow boss 128, and is configured to allow air and water vapor to pass while preventing entry of water droplets into the panel 100. The filter 200 may include a barrier membrane, formed of Gore-Tex® or other breathable waterproof material. As the ambient temperature is increased, the vent 128 prevents buildup of air pressure within the void 150, maintaining equilibrium between the pressure in void 150 and the ambient air pressure. This reduces the risk of malfunctions due to an increase in pressure within the void 150, otherwise tending to push the film 140 upwardly, and tending to detach the film from the upper housing or its close contact with the touch sensitive surface of the display 160.

In other embodiments, the vent may be positioned in other locations in the upper or lower housing, for example.

A waterproof user interface panel 100 as shown in FIGS. 2-6B thus includes an electronic display assembly 160 having a touch sensitive surface for activation of one or more touch switches, and housing (110, 120) for the assembly 160, the housing including a cutout area 113. A protective film 140 is disposed over the assembly 160 and secured to the housing at a peripheral region surrounding the cutout area to prevent moisture intrusion into the housing through the cutout area. The protective film 140 is configured to be flexible when touched by a user to permit activation of the touch switches of the electronic display assembly. In an exemplary embodiment, the housing includes a top surface 110A, a bottom surface 120A and a peripheral sidewall 120B between the top surface and the bottom surface to define a housing cavity, the cutout area being formed in the top surface. In this exemplary embodiment, the display assembly 160 is located adjacent the cutout area of the housing. Sealing material 196 is located in the housing cavity covering the bottom surface and having a sealing material top surface 196A above the bottom surface of the housing. The sealing material does not fill the housing, such that a void 150 is defined in the housing cavity between the top surface of the sealing material and the electronic display assembly. A vent 210 is provided between the void and the external environment to allow air to pass to equalize air pressure within the void to ambient air pressure. A filter 200 may be positioned in the vent to prevent the passage of water droplets through the filter and entering the vent from the external environment while allowing the passage of air and water vapor.

FIGS. 7-10 illustrate a further embodiment of a touch panel display system 300 particularly suitable for a spa or whirlpool bath application. The system in an exemplary embodiment employs a capacitive sensing assembly, rather than one which relies on physical deflection of the top surface of the panel assembly by the user pressing a button or area on the display active area. The system 300 includes an upper housing 310 and a lower housing 320 with a bottom surface 320A. A cutout area 316 is formed in the upper housing 310, defined by wall portion 310C, with a shelf portion 312 protruding inwardly and with a downwardly protruding lip or projection 314.

Figure 8A:
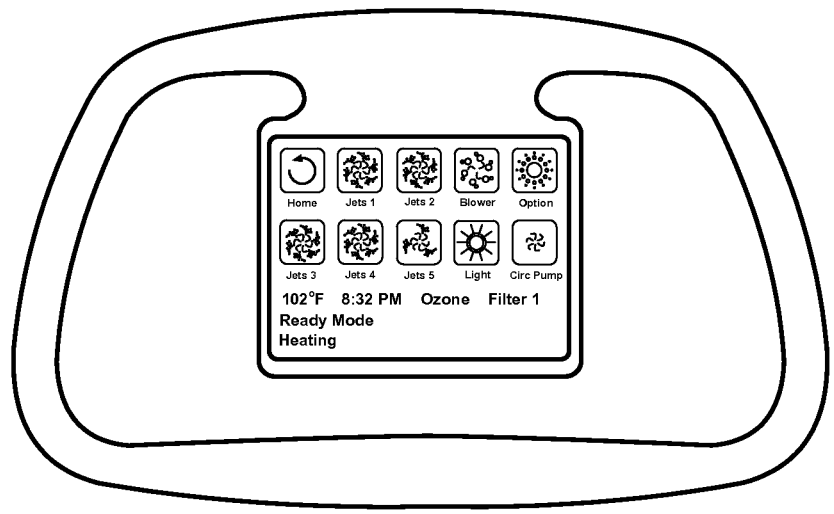
FIGS. 8A and 8B illustrate exemplary displays produced by the interface panel of FIG. 7, with FIG. 8A representing a top view of the user interface panel, including a display region, and FIG. 8B a close up of the display region, showing an exemplary screen produced by the panel with active "button" areas and an information status display.
Figure 8B:
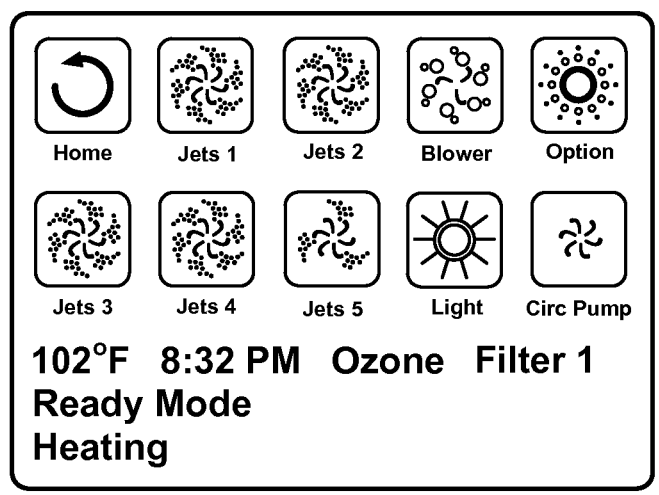

A cover layer 330, a touch panel assembly 340 and an electronic display module 350 are bonded together by index-of-refraction-matching optical adhesive layers 340A, 340B, for example, with adhesive layer 340A bonding together the cover layer 330 and the touch panel assembly 340, and adhesive layer 340B bonding together the touch panel assembly 340 and the display module 350. The cover layer 330 is transparent or translucent, and may be glass or plastic. The cover layer 330 may have an exemplary thickness of 1.1 mm (0.043 inch) in one example, although other thicknesses, e.g. 3 mm (0.118 inch) may be used. In this example the cover layer is a rigid layer, such as the "Gorilla Glass"™ product marketed by Corning. The touch panel 340 in this exemplary embodiment utilizes capacitive sensor technology, and senses changes in capacitance at areas of the active region of the panel 340 caused by nearness of a user's finger or other object such as a stylus to the touch panel assembly 340. The panel 340 may therefore be touch or presence-sensitive to the user's finger or other device such as a stylus. The sensitivity of the touch panel display may typically be adjusted, e.g. through software driver adjustment, so that the user may not need to even physically touch the cover layer to actuate a button or some other activity such as a swipe. The touch panel 340 is transparent or translucent in at least certain areas, to allow display icons or other symbology generated by the display module to be visible to the user. FIGS. 8A and 8B illustrate exemplary displays which may be produced in a spa environment by the display module 350 and visible through the cover layer and the touch panel.

Assemblies of embodiments of the cover glass 330 and touch panel 340 are commercially available.

The display module 350 may be a TFT LCD (thin film transistor liquid crystal display) module in an exemplary embodiment, although displays employing other technologies may alternatively be employed. The module 350 is bonded to the bottom side of the touch panel 340 by index-matching adhesive layer 340B, to form an assembly of the cover layer 330, touch panel 340 and display module 350.

The assembly of the cover layer, touch panel and display module may have a rectilinear configuration, or other configuration. The outer periphery (defined by wall portion 310C) of the cutout area 316 of housing 310 matches the peripheral external configuration of the cover layer 330. The peripheral external configuration of the touch panel and the display panel is somewhat smaller in dimension to the dimensions of the cover layer, so as to fit into the smaller open region 316A whose dimensions are determined by lip 314. The outer peripheral edge of the cover layer 330 overlaps the shelf portion 312, and an adhesive layer 332 secures the cover layer to the shelf portion 312. The depth of the shelf portion 312 from the top surface 310A of the housing structure 310 is cooperatively selected with the thickness of the cover layer 310 and the adhesive 332 so that the top surface of the cover layer 330 is substantially flush with the top surface 310A. The adhesive 332 is water resistant. Several foam gasket materials are available, as well as adhesive films, such as 3M 467MP and 468MP.

The system 300 includes a printed circuit board (PCB) 360, supported on standoff bosses or protrusions 322 extending from the bottom wall 324 of the back cover. The PCB 360 is connected to an external device such as a spa or bath controller system by wiring 390, passed through a water-tight fitting 380 secured in the bottom wall 324 of the back cover 320. The circuitry of the touch panel assembly 340 is electrically connected to a connector on the PCB by a flexible wiring ribbon schematically indicated in FIG. 7 as 342. The circuitry of the display panel 50 is electrically connected to another connector on the PCB by another flexible wiring ribbon schematically indicated in FIG. 7 as 352.

In this exemplary embodiment, the lower housing 320 and upper housing 310 are secured together by threaded fasteners 326 (FIG. 7). Alternatively, adhesives or other bonding techniques may be employed.

Waterproof potting compound or silicone gel 370 is placed in the back cover 320, and covers the PCB 360 and electrical components mounted to the PCB. In an exemplary embodiment, the gel 370 substantially fills the open area within the back cover, and above the PCB 360. There may be some small air voids not filled by gel, but in an exemplary embodiment, these voids will be small or nonexistent. One technique of filling the gel is to use a syringe to pass the gel through a port in housing 320, which is subsequently sealed. The cavity in the bottom cover 320 may be partially evacuated of air during the fill procedure to minimize air pockets.

The downwardly extending lip 314 in an exemplary embodiment forms a circumferential dam extending downwardly from the upper housing 310, surrounding the cutout area 316A, and penetrating the gel 370, ensuring that the back side of the display module 350 is water proof. The gel may contact the back side of the display module 350, as depicted in FIG. 7, or there may be a shallow air void or air pocket(s) between the top surface of the gel and the back side of the module 350. Power and signal wiring 390 from the external environment, e.g. from a control system 420 (FIG. 10), is connected to the PCB 360 through waterproof passthrough 380.

When constructed as described, the user interface panel 300 is waterproof from moisture on the top surface of the panel as well as from moisture from the bottom and sides of the panel.

FIGS. 8A and 8B illustrate exemplary panel displays which may be produced by the panel of FIG. 7, and showing "button" areas which may be actuated by close proximity or touching of the user finger or stylus.

Figure 9:
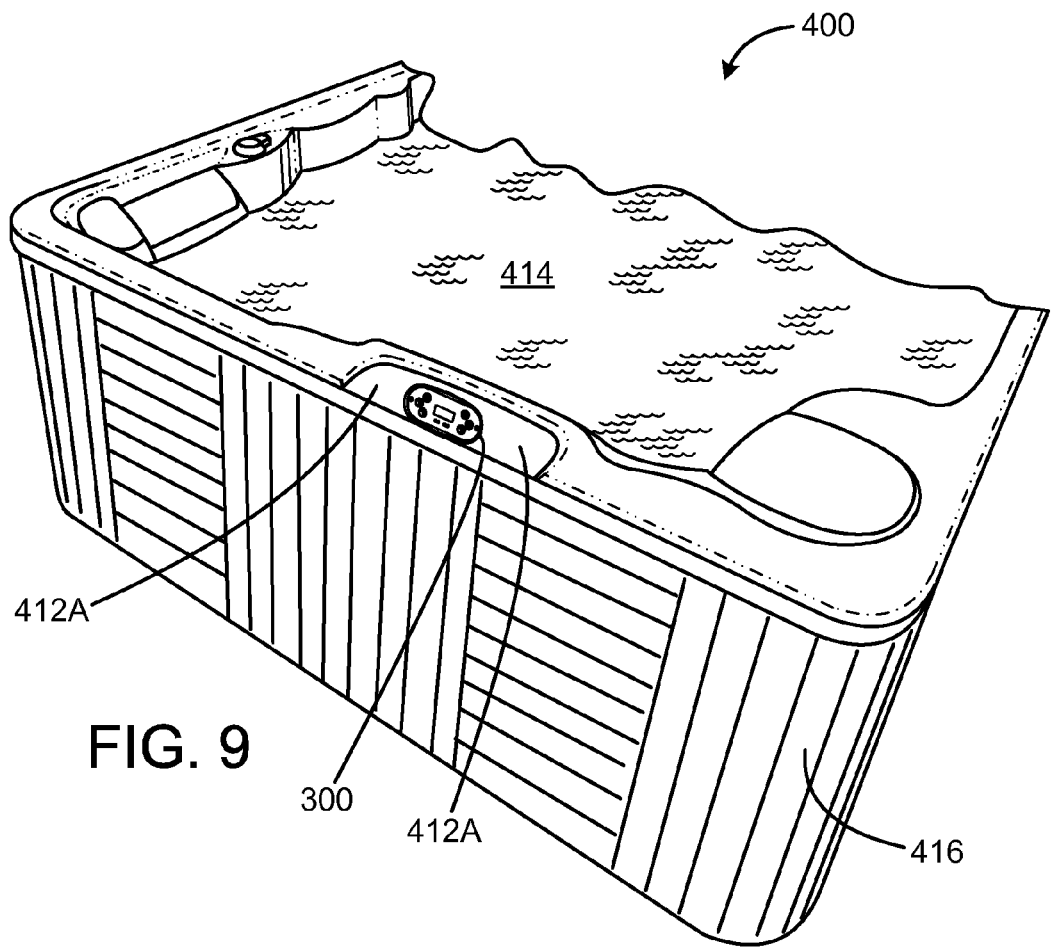
FIGS. 9 and 10 diagrammatically illustrate a spa application for a user interface panel.
Figure 10:
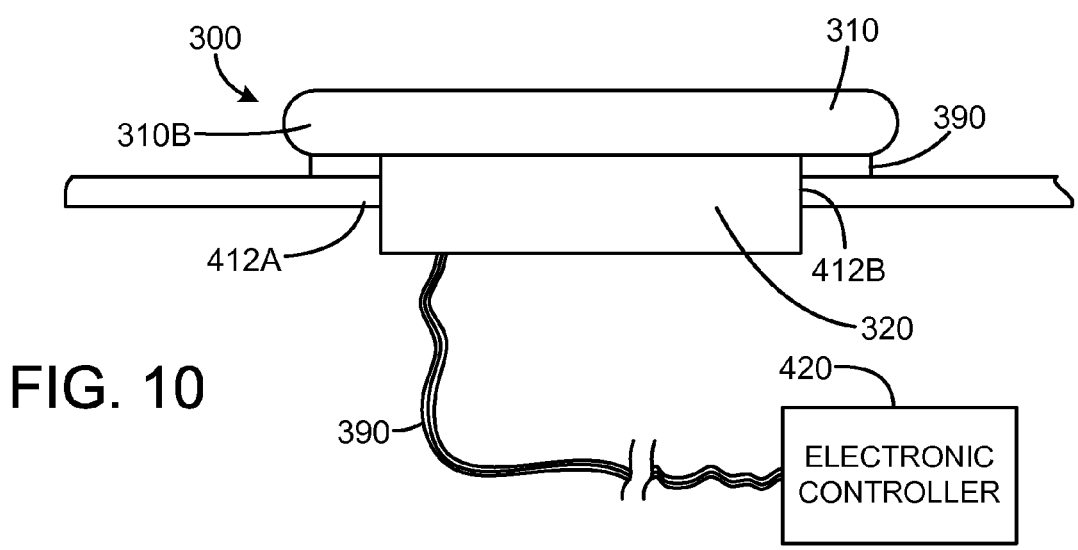

FIGS. 9 and 10 show an exemplary spa tub application for a user interface panel as illustrated in FIGS. 7, 8A and 8B. An exemplary bathing installation is a spa having a spa tub, although it will be appreciated that the subject matter may be practiced in connection with other bathing installations such as whirlpool baths and pools. FIG. 9 depicts a spa installation 400 including a tub 412 adapted to hold a volume of bathing water 414. The spa installation may include a side enclosure structure 416 which encloses the sides of the tub and equipment such as a heater, pump, blower and the like. An electronic control system may also be housed in a space between the spa tub and the enclosure structure.

In this exemplary embodiment, a user interface panel 300 is mounted to the tub wall at a location, e.g., on a tub wall top surface 412A accessible to a spa user. The panel 300, as described above, includes a display for displaying information to the spa user, incorporating tactile controls adapted to allow the spa user to control features of the spa, such as the water set temperature, the spa blower, lights and the like.

In many typical spa installations, the tub may be fabricated of a moldable material, such as fiberglass. The user interface panel may alternatively be installed in tubs fabricated of other materials, including metal and ceramic materials.

In an exemplary embodiment, the panel 300 may be installed by drilling or otherwise forming an opening in the tub wall at the mounting location to form a mount opening, disposing the panel housing through the mount opening so that a top flange portion of the panel housing is brought against the tub wall surface surrounding the opening, and securing the panel in place by an adhesive gasket or mounting fasteners.

FIG. 10 diagrammatically depicts an exemplary embodiment of a user interface panel 300 with a housing 310 and rear housing 320. The panel housing wall structure is installed through the mount opening 4128 formed in the tub wall 412A, and a flange portion 310B of the housing 310 is attached to the edge of the tub wall surface surrounding the mount opening by an adhesive gasket 390, although screws or other fasteners may alternatively be employed. A wiring harness 390 is connected between the panel 300 and the electronic controller 420 of the spa installation. The controller 420 responds to commands entered via the panel 300 to control operation of the spa, e.g. to turn on pumps, a spa heater, lights, blowers and other devices which are part of the spa installation, and in accordance with programmed operational sequences carried out by the controller processor.

Figure 11:
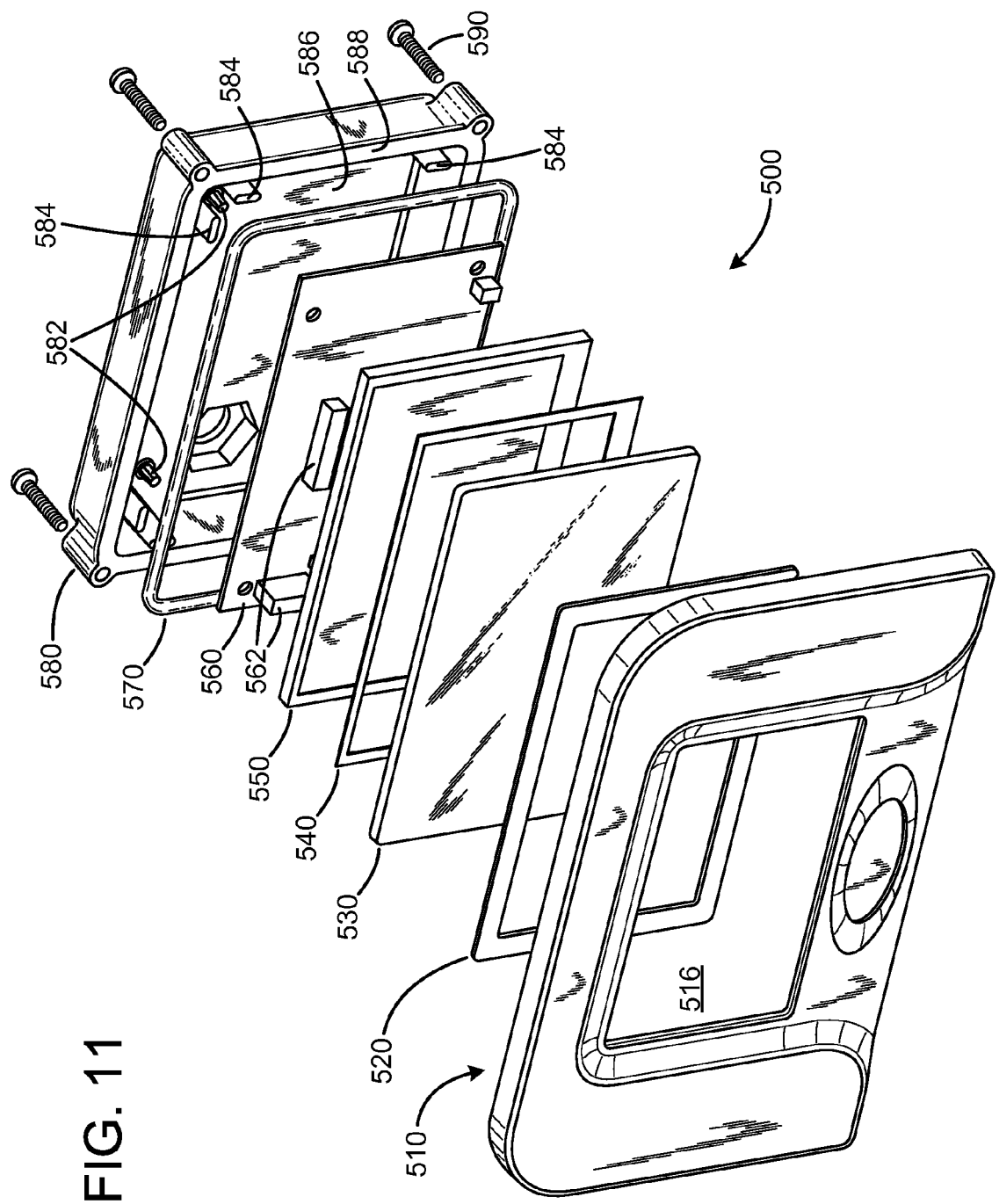
FIG. 11 is a front isometric exploded view of another exemplary embodiment of a user interface panel.
Figure 12:
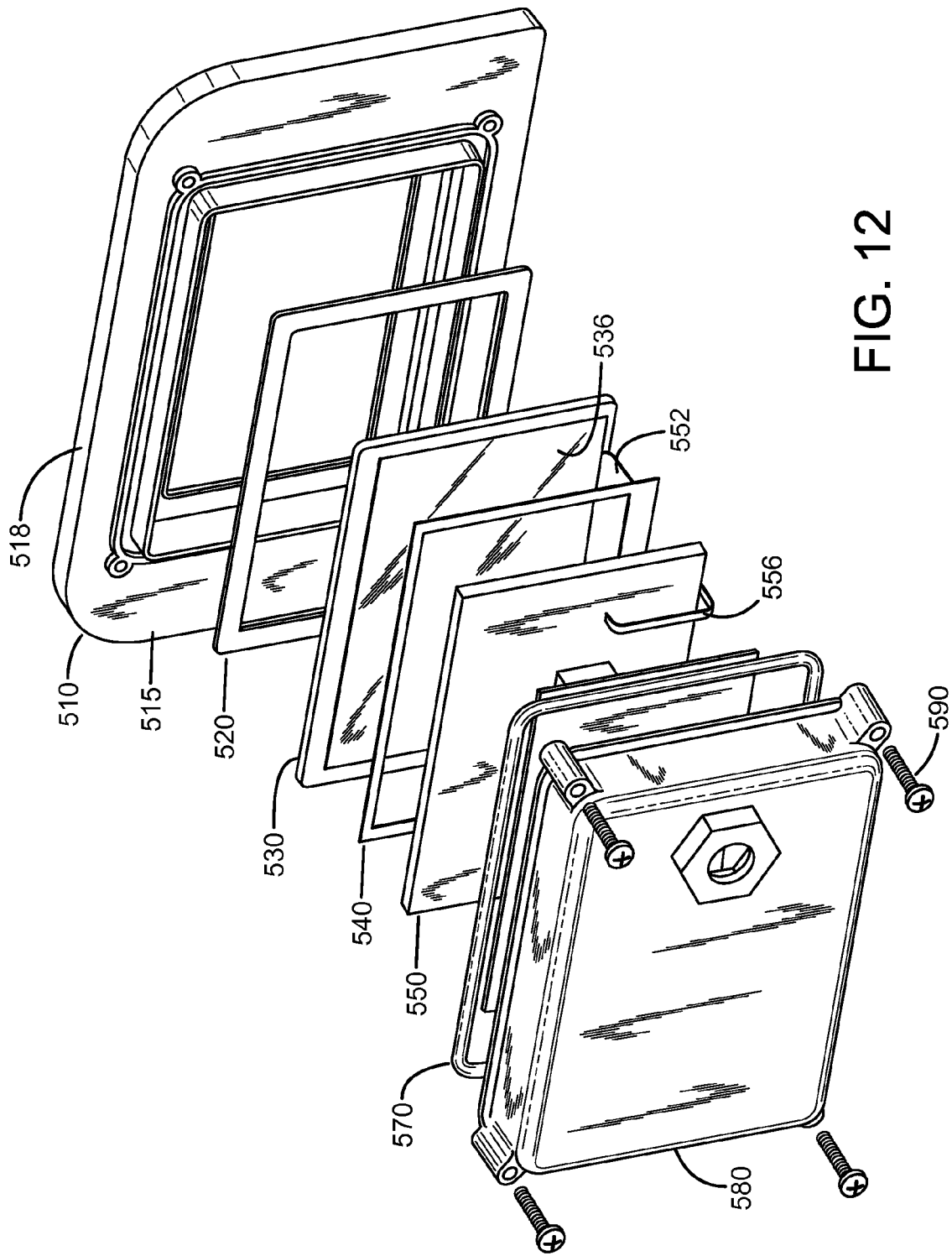
FIG. 12 is a rear isometric exploded view of the user interface panel of FIG. 12.
Figure 13:
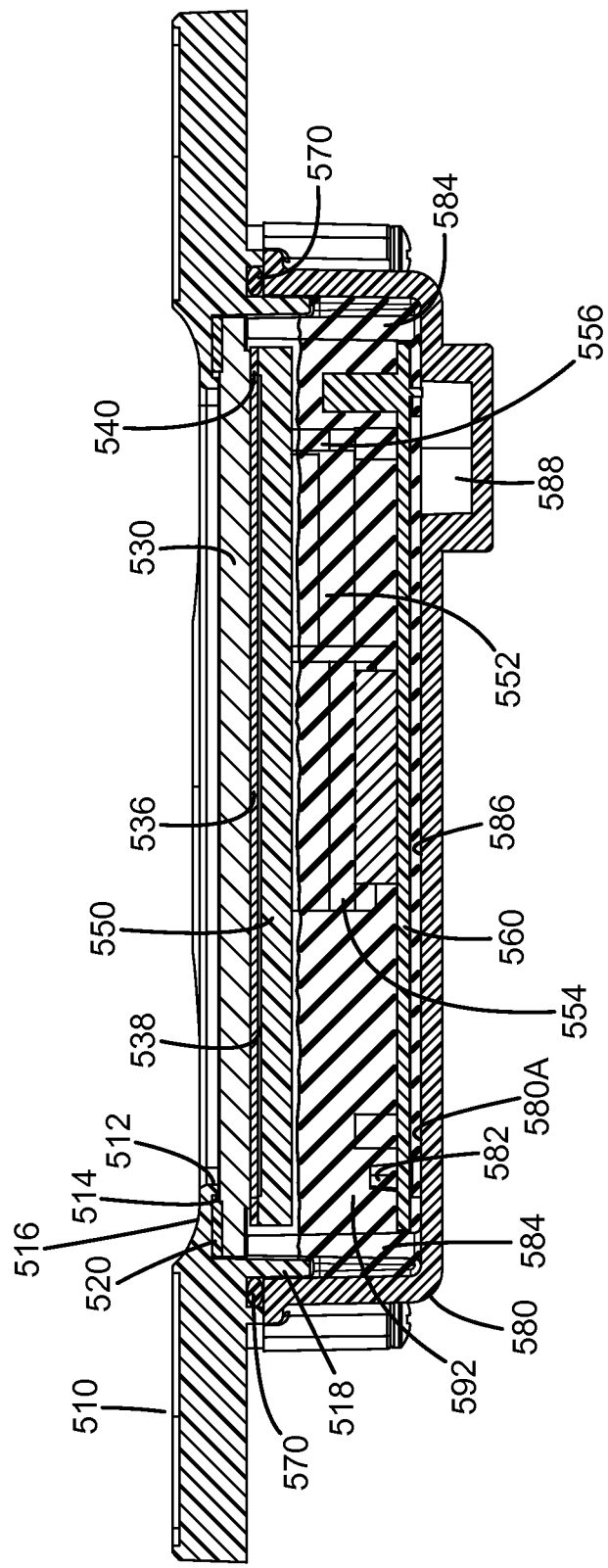
FIG. 13 is a diagrammatic cross-sectional view of the user interface panel of FIGS. 11 and 12.

FIGS. 11-13 illustrate a further exemplary embodiment of a user interface panel 500 particularly suitable for a spa or whirlpool bath application. As with the embodiment of FIGS. 7-10, the panel 500 employs a presence-sensitive sensing assembly, e.g. a capacitive sensing assembly, rather than one which relies on physical deflection of the top surface of the panel assembly by the user pressing a button or area on the display active area. The system 500 includes an upper housing 510 and a lower housing 580 with a bottom surface 580A. An open area or window 516 is formed in the upper housing 510, defined by wall portion 512. A shallow recess 514 is formed on the underside of housing portion 516, between the edge of protrusion 518 and the bottom edge of wall portion 512.

The top peripheral edge of a transparent cover layer 530 is bonded to the back surface of the upper housing 514, at the recess 514 of the upper housing 510 by a gasket seal 520 fitted to the recess 514. The gasket seal in an exemplary embodiment is a double sided tape structure, with water resistant adhesive adhering the peripheral edge of the cover layer to the housing structure. The cover layer 530 is transparent or translucent, and may be glass or plastic. The cover layer 330 may have an exemplary thickness of 3 mm (0.118 inch) in this exemplary embodiment; other thicknesses may be used for other embodiments. In this example the cover layer is a rigid layer of a chemically strengthened glass, such as the "Gorilla Glass"™ product marketed by Corning. With a rigid cover layer, a vent may typically not be necessary.

The bottom peripheral edge of the cover layer 530 is supported on corner standoffs 584 protruding from the bottom surface 586 of the lower housing structure, as illustrated in FIG. 13. The height of the standoffs 584 is cooperatively chosen with the thickness of the cover layer 530 and that of the adhesive 520 so as to firmly capture and secure the cover layer between the upper and lower housing structures.

In an exemplary embodiment, a touch sensitive layer 536 is optically bonded to the underside of the cover layer 530 by index-matching adhesive. A wiring cable 552 connects the touch sensitive layer to circuitry on the printed circuit board 560. The touch sensitive layer 536 in this exemplary embodiment utilizes capacitive sensor technology, and senses changes in capacitance at areas of the active region of the panel 500 caused by nearness of a user's finger or other object such as a stylus to the touch sensitive layer. The panel 500 may therefore be touch or presence-sensitive to the user's finger or other device such as a stylus. The sensitivity of the touch panel display may typically be adjusted, e.g. through software driver adjustment, so that the user may not need to even physically touch the cover layer to actuate a button or some other activity such as a swipe.

A display assembly 550 includes an electronic display module, and is in turn adhered to the peripheral edge of the cover layer 530 by another gasket seal 540. A small air gap 538 (FIG. 13) is formed between the touch sensitive layer 536 and the top surface of the display assembly 550. The seal 540 can be a double sided tape structure. The cover layer is transparent or translucent in at least certain areas, to allow display icons or other symbology generated by the display to be visible to the user, in a manner as shown in FIGS. 8A and 8B.

Touch/presence-sensitive display assemblies suitable for the purpose of layer 536 and assembly 550 are commercially available.

The display assembly 550 may be a TFT LCD (thin film transistor liquid crystal display) module in an exemplary embodiment, although displays employing other technologies may alternatively be employed.

The assembly of the cover layer 530, the touch/presence-sensitive layer 536 and the display assembly 550 may have a rectilinear configuration, or other configuration. In this exemplary embodiment, the outer periphery (defined by wall portion 512) of the cutout area or region 516 of the upper housing 510 generally matches the peripheral external configuration of the cover layer 530, although somewhat smaller in relation to the dimensions of the cover layer, whose maximum dimensions are determined by peripheral protrusion 518.

The system 500 includes a printed circuit board (PCB) 560, supported on standoff bosses or protrusions 582 extending from the bottom wall 586 of the back cover 580. The PCB 580 is connected to an external device such as a spa or bath controller system by wiring (not shown in FIG. 11) passed through a water-tight fitting secured in port 588 in the bottom wall 586. The circuitry of the display assembly 550 is electrically connected to a connector on the PCB by a flexible wiring ribbon schematically indicated in FIG. 13 as 554. The circuitry of the touch sensitive layer 536 is electrically connected to another connector on the PCB by another flexible wiring ribbon schematically indicated in FIGS. 12 and 13 as 552. Another ribbon cable 556 connects a back light to the PCB.

In this exemplary embodiment, the lower housing 520 and upper housing 580 are secured together by threaded fasteners 590 (FIG. 11). Alternatively, adhesives or other bonding techniques may be employed.

Waterproof potting compound or silicone gel 592 (FIG. 13) is dispensed into the back cover 580, and covers the PCB 560 and electrical components mounted to the PCB (diagrammatically illustrated as 562 in FIG. 11). In an exemplary embodiment, the gel 590 substantially fills the open area within the back cover, and above the PCB 360. There may be some small air voids not filled by gel, but in an exemplary embodiment, these voids will be small or nonexistent.

The peripheral protrusion 518 in an exemplary embodiment forms a circumferential dam extending downwardly from the upper housing 510, surrounding the cutout area 516, and penetrating the gel 592, ensuring that the back side of the display module 550 is water proof. The gel may contact the back side of the display module 550, or there may be a shallow air void or air pocket(s) between the top surface of the gel and the back side of the module 550. Power and signal wiring from the external environment, e.g. from a control system 420 (FIG. 10), is connected to the PCB 560 through a waterproof passthrough as described above.

A further waterproofing feature is provided by elastomeric O-ring 570, which is captured in a peripheral groove or channel 515 in the upper housing by the top edge 588 of the lower housing 580. The top edge may have a shallow groove formed to capture the O-ring as well. The O-ring is an elastomeric member, which can be compressed as the upper and lower housing structures are brought together to the assembled configuration.

When constructed as described, the user interface panel 500 is waterproof from moisture on the top surface of the panel as well as from moisture from the bottom and sides of the panel.

Others skilled in the arts may make changes in what is taught herein without departing from the spirit of the present invention.

What is claimed is:
1. A waterproof user interface panel comprising:
a display touch or presence-sensitive assembly including:
  an electronic display;
  a presence-sensitive layer; and
  a rigid transparent or translucent cover layer overlying a top surface of the presence-sensitive layer;
a housing for said assembly, the housing including a cutout or window area; and
a peripheral edge of the cover layer secured to said housing at a peripheral region surrounding the cutout area to prevent moisture intrusion into said housing through the cutout area; and wherein:
said housing includes an upper housing and a lower housing, the cutout area or window being formed in the upper housing, with said assembly located in said upper housing and adjacent the cutout area of the upper housing, the lower housing having a bottom surface and a peripheral sidewall defining a housing cavity;

sealing material located in the lower housing having a sealing material top surface above the bottom surface of the lower housing;

said upper housing including a peripheral protrusion surrounding the cutout or window area and which extends into the housing cavity in the lower housing and penetrates the sealing material in the lower housing when said upper and said lower housings are assembled such that a portion of the protrusion is embedded in the sealing material to form a waterproof seal to protect a back side of said assembly from external moisture.

2. The interface panel of claim 1, wherein said cover layer is a chemically strengthened glass layer.

3. The interface panel of claim 1, further comprising:

a circuit board secured to the lower housing and electrically coupled to the display presence-sensitive assembly, the sealing material covering the circuit board.

4. The interface panel of claim 3, wherein said lower housing has protrusions to hold said circuit board in a fixed position relative to said lower housing.

5. The interface panel of claim 1, wherein the sealing material is a gel material.

6. The interface panel of claim 1, wherein the lower housing has standoff protrusions configured to contact and support the cover layer when said upper and said lower housings are assembled.

7. The interface panel of claim 1, further comprising an O-ring seal disposed between surfaces of the upper housing structure and the lower housing structure when the upper and lower housing structures are assembled together.

8. The interface panel of claim 1, wherein the peripheral edge of the cover layer is secured to the upper housing structure by an adhesive layer.

9. The interface panel of claim 1, wherein said presence-sensitive layer is responsive to changes in capacitance resulting from touching or close proximity of an object to the layer.

10. The interface panel of claim 1, wherein the peripheral edge of the cover layer is secured to a back surface of the upper housing structure.

11. The interface panel of claim 1, wherein said panel is configured for use with a bathing installation and for mounting in an opening of a wall of a bathing installation tub, and wherein the housing includes a peripheral flange portion for mounting to a tub wall surface surrounding the opening, the panel display configured to display information to the bathing installation user, the panel including controls configured to allow the bathing installation user to control features of the bathing installation.

12. The interface panel of claim 1, wherein said panel is configured for use with a bathing installation and for mounting in an opening of a wall of a bathing installation tub, and wherein the housing includes a peripheral flange portion for mounting to a tub wall surface surrounding the opening, the panel display configured to display information to the bathing installation user, the panel including controls configured to allow the bathing installation user to control features of the bathing installation.

13. A user interface panel comprising:

an electronic display;

a presence-sensitive screen positioned over and secured to said electronic display to form a display/presence-sensitive screen assembly responsive to sensed changes in capacitance at areas of an active region of the assembly;

a housing structure comprising an upper housing and a lower housing, the upper housing including a cutout area;

said assembly located in said upper housing and adjacent the cutout area of the upper housing, the housing structure having a bottom surface and a peripheral sidewall defining a housing cavity;

a rigid transparent or translucent cover layer overlying a top surface of the presence-sensitive screen and bonded to said top surface, and wherein a peripheral edge of the cover layer is secured to said housing structure at a peripheral region surrounding the cutout area to prevent moisture intrusion into said housing through the cutout area;

sealing material located in the housing cavity;

said upper housing including a peripheral protrusion surrounding the cutout area and which extends into the housing cavity and penetrates the sealing material such that a portion of the protrusion is embedded in the sealing material to form a waterproof seal to protect a back side of said assembly from external moisture.

14. The interface panel of claim 13, further comprising:

a circuit board secured to the lower housing and electrically coupled to the presence-sensitive panel and to the electronic display, the sealing material covering the circuit board.

15. The interface panel of claim 13, wherein the sealing material is a gel material.

16. The interface panel of claim 13, wherein the peripheral edge of the cover layer is secured to a back surface of the upper housing structure.

* * * * *